Figure 1:
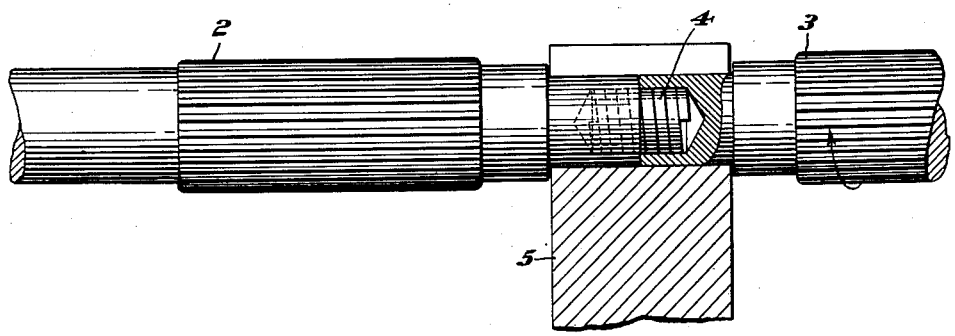

Feb. 14, 1939.   L. M. COTCHETT   2,147,282
FLEXIBLE SHAFTING COUPLING
Filed July 27, 1937

INVENTOR
Louis M. Cotchett,
BY
ATTORNEY.

Patented Feb. 14, 1939

2,147,282

UNITED STATES PATENT OFFICE 2,147,282

FLEXIBLE SHAFTING COUPLING

Louis M. Cotchett, Hingham, Mass., assignor, by mesne assignments, to Saco-Lowell Shops, Biddeford, Maine, a corporation of Maine Application July 27, 1937, Serial No. 155,913

1 Claim. (Cl. 64—15)

This invention relates to means for flexibly joining the component sections of long shafting lines in a fixed rotational relationship for the transmission of torque from each section to the next adjacent section.

The need for so joining the sections of shafting arises in many machines, and especially in certain textile machines, such as spinning and twister frames, roving frames, and others in which the drawing and feeding rolls are connected together end to end to produce long shafting lines, the short component sections of which are manufactured independently for convenience in production. Such shafting lines are supported in suitably spaced bearings, and because of the great length of these lines, it is practically impossible to preserve their exact axial alinement for any great period of operation. The present invention aims to devise a coupling which can be used in operatively connecting adjoining sections to each other to transmit the operating torque from one to another while permitting that flexibility between sections necessary to enable each section to dispose itself in alinement with its respective bearing support or supports and thus avoid the necessity for maintaining a precise complementary alinement of said bearings.

The invention involves a novel utilization of forces by combination and arrangement of parts, more particularly to be described hereinafter, and defined in the accompanying claim.

Figure 2:
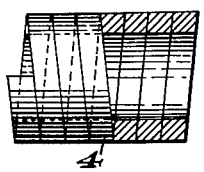

In the drawing illustrating a workable form of the invention:

Figure 1 is a side elevation, partly in section, showing the joint or coupling between ends of two of the component lengths or sections of a shafting line; and Figure 2 is a similar view on a larger scale of the spring which connects the sections shown in Figure 1.

Figure 1 shows the invention as applied to one of the lower drawing rolls of a spinning, twisting, or roving frame, portions of two adjoining roll sections being indicated at 2 and 3, respectively. As is well understood by those skilled in this art, such machines as those just named include several lines of these rolls or shaft sections, all positively driven by gearing located at one end of the machine, and the adjoining sections in each line being so connected together that torque is transmitted by each roll section successively to its neighbor.

According to the present invention, the abutting or adjacent ends of the two sections 2 and 3 have holes drilled in them in axial alinement with each other and with the rolls and the ends of a closely wound helical spring 4 are mounted in these holes. The diameter of the spring, when in its natural or unconfined condition, is slightly larger than that of the holes so that it is maintained in a state of radial compression or preloading when in its working position. Thus the expansion of the spring against the walls of the holes creates a radial pressure sufficient to transmit a substantial driving torque between sections.

When such a spring as that shown is twisted in a direction counter to its helix, or, in other words, in a direction opposite to that in which it is wound, a resultant expansion of the spring occurs. Consequently, when the section 3 is revolved in the direction indicated by the arrow, there will be a tendency to unwind the spring 4, and since it is already in substantial frictional contact with the restraining walls of the sockets in which it is mounted, the applied torque is converted into a proportional radial pressure between the expanding spring and said walls. Thus the two members 2 and 3 lock firmly one to the other for the transmission of the rotative movement and no slippage between them occurs. In other words, the spring seizes the walls of its sockets rigidly so that the two shafting sections are carried in a fixed rotational relationship in the desired direction. If, however, the direction of rotation is reversed, then only a relatively low torque can be transmitted because the effect on the spring is to contract it and thus to reduce its grip on its confining walls. It therefore slips under any substantial torque. Advantage is taken of this fact in mounting the spring in the shaft sections, the ends of the spring being screwed into its sockets in the direction in which it is wound.

In order to produce a maximum frictional engagement of the spring with the walls of the holes in which it is mounted, it is preferable to make the spring of wire of rectangular cross-section, or at least to have the outer surface of the wire "flat". Also, the spring should be closely wound so that adjacent turns will be substantially in contact with each other. Thus a maximum peripheral surface engagement will be produced between the spring and the cylindrical walls of its sockets.

In the accommodation of flexing or departures by one or the other of the shafting sections from a common axial line, the circumference of the abutting ends of the two sections act as peripherally progressing fulcrums so that there is a tendency to separate or place under tension those portions of the assembly in the vicinity of the axis and this tendency toward elongation, acting on the spring, tends to reduce its diameter along a short portion of the center of its length, thus relieving its pressure against the walls of its restraining cavities in the vicinity of this stress so that the helixes so freed may slide longitudinally within their cavities in response to the flexing action at the joint. The spring itself being inherently flexible will bend to accommodate axial deflections of any magnitude commonly found in lines of shafting.

Preferably the ends of the sections are located substantially in abutting relationship, although they may be spaced apart slightly, but in no event should they be separated by a distance greater than the axial thickness of the wire of which the spring 4 is composed.

It is preferable, also, to have the dimensions of the elements such that the entire spring will be confined both axially and radially. With such a relationship a surprisingly high torque can be transmitted with a relatively small spring for the reason that the stresses created in it by the application of the rotative effort all tend to expand the spring, but since it is confined in all directions, there is no place for it to go. Thus as these stresses are increased the walls of the sockets are more likely to rupture than is the spring to fail. This is a very valuable factor in a relationship such as that shown where it is important to have the coupling inherently smaller radially than the diameter of the shafting ends which it joins.

It is contemplated that such a joint as that shown will be located at each bearing support. The drawing shows the reduced end portions of the sections 2 and 3 mounted in a roll stand 5 of the character commonly used in spinning, twisting, and roving frames. These bearings ordinarily have a rather generous fit about the shafting journals which permits some deflection from a common axis.

A typical roll size is approximately one inch in outside diameter at the fluted, knurled, or otherwise roughened working surfaces, and this dimension often is reduced to approximately three-quarters of an inch, or less, at the journal sections. A spring 4 having an outside diameter of one-half an inch, or even less, is ample to transmit the torque required in these very long lines of shafting, and this small dimension is an important advantage when the joint is used in such a relationship as that shown. A further advantage of this construction is that the manufacturing operations are exceptionally simple, as will be evident from an inspection of the drawing, no fastening of the spring to either roll section being required other than that produced by its own resiliency. Moreover, the rate of wear and depreciation on such a joint under any reasonable conditions is negligible, and even when replacements become necessary, they can be effected very easily and economically.

While I have herein shown and described a typical embodiment of my invention, it will be understood that the invention may be embodied in other forms and applied to other relationships without departing from the spirit or scope thereof.

Having thus described my invention, what I desire to claim as new is:

The combination of two shaft sections mounted end to end, said sections having cylindrical holes in their adjacent ends, a helical spring having its opposite end portions positioned in said holes whereby it connects said sections together, said holes being slightly smaller in diameter than the natural diameter of the spring, whereby the spring expands into firm engagement with the walls of said holes by virtue of its own resiliency, the ends of said sections being positioned in substantially abutting relationship to each other whereby said spring is completely enclosed in said sections and its entire peripheral surface is confined by the walls of said holes, said spring being composed of spring wire having a flat outer surface.

LOUIS M. COTCHETT.